3,769,385
METHOD OF PREPARING NON-SOLVATED
ALUMINUM HYDRIDE
Theodore C. Kraus, Cheshire, Conn., assignor to Olin
Mathieson Chemical Corporation
No Drawing. Filed Feb. 5, 1963, Ser. No. 256,477
Int. Cl. C01b 6/00
U.S. Cl. 423—645    5 Claims

ABSTRACT OF THE DISCLOSURE

This invention relates to a method in which an alkali metal hydride is reacted with aluminum chloride in a lower dialkyl ether and in the presence of a minor amount of lithium aluminum hydride to yield non-solvated aluminum hydride.

Aluminum hydride is useful as a reducing agent, as a fuel in solid propellants, and as an intermediate. The non-solvated, aluminum hydride of this invention when incorporated with oxidizers is capable of being formed into a wide variety of grains, tablets and shapes all with desirable mechanical and chemical properties. Propellants produced by the method described in this application burn uniformly without distintegration when ignited by conventional means, such as a pyrotechnic type igniter, and are mechanically strong enough to withstand ordinary handling.

Although a great number of attempts have been made to prepare non-solvated aluminum hydride, the end result has been the formation of either an impure polymeric product or a solid solvated polymer from which the removal of all of the solvent without decomposition could not be achieved, Finholt et al. (JACS, 69, 1199–1203) (1947)) reacted lithium aluminum hydride with aluminum chloride in the presence of diethyl ether and obtained a solid with the variable composition. Although the ratio of hydrogen to aluminum in the solid was 3:1 within experimental error, the total weight of the aluminum and hydrogen in the solid product was always less than the total weight of the sample, the difference being in weight, of the diethyl ether in the solvated compound.

In the method of this invention an alkali metal hydride is reacted with aluminum chloride in a lower dialkyl ether and in the presence of a minor amount of lithium aluminum hydride to yield the alkali metal chloride and aluminum hydride. The reaction takes place according to the following equation:

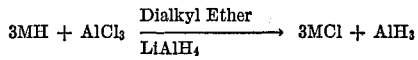

wherein M is an alkali metal. The reaction can be conveniently carried out by adding the aluminum chloride as a solid or as a solution in ether to a slurry of the alkali metal hydride containing a minor amount of lithium aluminum hydride in the lower dialkyl ether. The alkali metal chloride formed during the reaction is insoluble in the lower dialkyl ether and immediately precipitates from the reaction mixture as it is formed. At the conclusion of the reaction the reaction mixture is allowed to settle and the supernatant liquor removed and filtered through a sintered glass funnel under nitrogen into a suitable receiving flask. The ether is stripped from the supernatant reactor liquor yielding a white, solid product containing the aluminum hydride in etherated form. It is recommended that before proceeding with the desolvation or removal of ether step that the dry solid be ground to a fine powder. Desolvation of the etherated aluminum hydride can be effected over a wide range of conditions in respect to time and condition employed. In the initial stages it is sufficient to maintain the intermediate product being desolvated under conditions of ambient temperature while preferably subjecting the material to an inert gas sweep or to a vacuum, however, the latter part of the desolvation step, in which the final quantity of ether is removed from the solvated product, requires temperatures from about 60° C. to about 150° C. The rate of removal of the ether from the solvated product is dependent upon the particle size, exposure of the surface and efficiency of removal of the liberated ether. Depending upon the method used, the time required for desolvation will range from about 0.5 to about 20 hours or more. The product remaining after the heat treatment phase contains the aluminum hydride product in non-solvated form together with certain impurities which can be removed from the non-solvated product by washing with a lower dialkyl ether. Following the ether wash the product is dried again, preferably either under vacuum or with the aid of a nitrogen sweep, at room temperature or at slightly higher temperatures.

The temperature of the reaction will generally be from about −10° C. to about +60° C., with the preferred temperature being from about +10° C. to about +40° C.

In carrying out the reaction any of the lower dialkyl ethers can be employed. Suitable lower dialkyl ethers include methyl ether, ethyl ether, n-propyl ether, n-butyl ether, n-amyl ether, methyl ethyl ether, methyl propyl ether, methyl butyl ether, ethyl propyl ether, ethyl butyl ether, propyl butyl ether, isopropyl ether, isobutyl ether, isoamyl ether, methyl isopropyl ether, methyl isobutyl ether, ethyl isobutyl ether, ethyl isopropyl ether, ethyl isobutyl ether, ethyl isoamyl ether, etc.

Although generally stoichiometric quantities of the lithium hydride and aluminum chloride will be reacted, an excess of the alkali metal hydride can be employed if desired. The quantity of the alkali metal hydride reacted with aluminum chloride can be varied from 3.0 to about 3.5 moles of the alkali metal hydride per mole of aluminum chloride. The quantity of lithium aluminum hydride promoter employed can also be varied widely from about 0.002 to about 0.030 mole per mole of alkali metal hydried charged to the reactor. It is necessary that some lithium aluminum hydride be present in the final stages of the process to facilitate ether removal and conversion to the more stable form of aluminum hyirde. Suitable alkali metal hydrides include lithium hydride, sodium hydride and potassium hydride.

EXAMPLE I

In a 2 liter, three-necked flask fitted with a dry-ice-acetone condenser and an addition tube containing solid aluminum chloride, 12.22 grams (1.53 mole) of lithium hydride was slurried by means of a high speed stirring with 1300 ml. of ether containing 0.5 gram (0.013 mole) of lithium aluminum hyride for approximately 40 min. Over a three hour period 66 g. (0.50 mole) of aluminum chloride was added to the flask. Stirring was continued for an additional 30 minute period after all the aluminum chloride had been added. A nitrogen atmosphere was maintained in the reaction flask in order to exclude moisture and air from the vessel. On termination of the stirring the solid lithium chloride which had formed settled immediately whereupon the supernatant liquid was filtered under nitrogen pressure through a sintered glass funnel into a 2 liter round-bottom flask. The ether was stripped from the filtered solution and the white solid which resulted was then ground and dried under high vacuum (about $10^{-2}$ to $10^{-3}$ mm. Hg) for approximately 18 hours. Desolvation of the dry product was achieved by achieved by heating under high vacuum with periodic agitation from room temperature to 70° C. in 35 minutes, from 70° C. to 90° C. over an additional 25 minute period and finally maintained at 100° C. for about 30 minutes. In the next step, the heat treated product was washed with a 100 ml. portion of dry ether for about 50 minutes, filtered, and washed on the funnel with two additional 25 ml. portions of ether in order to remove any lithium aluminum hydride present in the product. Final drying of the non-solvated aluminum hydride product was carried out by subjecting the product wet with ether to high vacuum treatment for 2.5 hours which include a short heating period of 30 minutes at 50° C. to 60° C. Some 7.8 grams of non-solvated aluminum hydride was recovered which corresponds to a yield of 56 percent based on the theoretical quantity.

The final product was analyzed for aluminum, hydrogen, carbon, chlorine, and lithium and the following results were obtained:

Calc'd for $AlH_3$ (percent): Al, 89.92; H, 10.08; C, __; Cl, __; Li, __. Found (percent): Al, 85.6; H, 9.9; C, 0.7; Cl, 1.09; Li, 0.6.

EXAMPLE II

This experiment, in which 1.50 moles of lithium hydride was reacted with 0.5 mole of aluminum chloride in the presence of diethyl ether and in the presence of 0.013 mole of lithium aluminum hydride, was carried out in the same manner as described in Example I. After the solvated product had been recovered from the filtered reaction liquor by removing the ether under vacuum, desolvation was accomplished by heating the solvated product under high vacuum from room temperature to 75° C. over a period of 50 minutes, at 75°–80° C. for one hour, at 80°–100° C. in 20 minutes and finally at 100° C. for 30 minutes. An X-ray analysis of the product at this stage indicated that aluminum hydride present in the sample was in non-solvated form. The desolvated material was washed with diethyl ether as previously described in Example I and then subjected to high vacuum for 18 hours, to remove the residual ether. Non-solvated aluminum hydride in the amount of 8.7 g. (58 percent of the theoretical yield) was recovered.

The non-solvated aluminum hydride was analyzed for a aluminum, carbon, hydrogen, chlorine and lithium and the following results were obtained:

Calc'd for $AlH_3$ (percent): Al, 89.92; H, 10.08; C, __; Cl, __; Li, __. Found (percent): Al, 87.0; H, 9.9; C, 0.5; Cl, 1.40; Li, 0.5.

The non-solvated aluminum hydride produced by practicing the method of this invention can be employed as ingredients of solid propellant compositions in accordance with general procedures which are well understood in the art, inasmuch as the non-solvated aluminum hydride produced by practicing the present process is readily oxidized by using conventional solid oxidizers, such as ammonium perchlorate, potassium perchlorate, sodium perchlorate, ammonium nitrate and the like. In formulating a solid propellant composition employing non-solvated aluminum hydride produced in accordance with the present invention, generally from 10 to 35 parts by weight of non-solvated aluminum hydride and from 65 to 90 parts by weight of oxidizer, such as ammonium perchlorate, are present in the final propellant composition. In the propellant, the oxidizer and the product of the present process are formulated in intimate admixture with each other, as by finely subdividing each of the materials separately and thereafter intimately admixing them. The purpose in doing this, as the art is aware, is to provide proper burning characteristics in the final propellant. In addition to the oxidizer and the oxidizable material, the final propellant can also contain an artificial resin, generally of the urea-formaldehyde or phenol-formaldehyde type, the function of the resin being to give the propellant mechanical strength and at the same time improve its burning characteristics. Thus, in manufacturing a suitable propellant, proper proportions of finely divided oxidizer and finely divided non-solvated aluminum hydride can be admixed with a high solids content solution of a partially conensed urea-formaldehyde or phenol-formaldehyde resin, the proportions being such that the amount of the resin is about 5 to about 10 percent by weight, based upon the weight of the oxidizer and the non-solvated aluminum hydride. The ingredients are thoroughly mixed with simultaneous removal of the solvent, and following this the solvent-free mixture is molded into the desired shape, as by extrusion. Thereafter, the resin can be cured by resorting to heating at moderate temperatures. For further information concerning the formulation of solid propellant compositions, reference is made to U.S. Pat. N. 2,622,277 to Bonnell et al. and U.S. Pat. No. 2,646,596 to Thomas et al.

What is claimed is:

1. A method for the preparation of non-solvated aluminum hydride which comprises: (A) reacting 3.0 to about 3.5 moles of an alkali metal hydride with one mole of aluminum chloride in the presence of a minor amount of lithium aluminum hydride and in the presence of a lower dialkyl ether, (B) separating solid and liquid phases of the resulting reaction mixture, (C) recovering from the resulting liquid phase a solvated aluminum hydride product containing lithium aluminum hydride, (D) heating the said solvated aluminum hydride product at a temperature of from about 20° C. to about 150° C. and for a period of time sufficient to remove the lower dialkyl ether associated with the aluminum hydride whereby a non-solvated aluminum hydride product containing lithium aluminum hydride is obtained, (E) washing the said non-solvated aluminum hydride product containing lithium aluminum hydride with a lower dialkyl ether and (F) drying the thus-washed product whereby non-solvated aluminum hydride is recovered.

2. The method of claim 1 wherein the reaction is carried out at a temperature within the range of from about $-10°$ C. to about $+60°$ C.

3. The method of claim 1 wherein the alkali metal hydride is lithium hydride.

4. The method of claim 1 wherein the lower dialkyl ether is diethyl ether.

5. The method for the preparation of non-solvated aluminum hydride which comprises: (A) reacting 3.0 to about 3.5 moles of lithium hydride with one mole of aluminum chloride in the presence of a minor amount of lithium aluminum hydride at a temperature of from about $-10°$ C. to about $+60°$ C. and in the presence of diethyl ether, (B) separating solid and liquid phases of the resulting reaction mixture, (C) recovering from the resulting liquid phase a solvated aluminum hydride product containing lithium aluminum hydride, (D) heating the said solvated aluminum hydride product at a temperature of from about 20° C. to about 150° C. and for a period of time sufficient to remove the diethyl ether associated with the aluminum hydride whereby a non-solvated aluminum hydride product containing lithium aluminum hydride is obtained, (E) washing the said non-solvated aluminum hydride product containing lithium aluminum hydride with a lower dialkyl ether and (F) drying the thus-washed product whereby non-solvated aluminum hydride is recovered.

(References on following page)

References Cited

UNITED STATES PATENTS 2,567,972  9/1951  Schlesinger et al. _____ 23—14

OTHER REFERENCES

Chizinsky et al.: Journal of the American Chemical Society, vol. 77, pp. 3164–5 (1955).

Finholt et al.: Journal of the American Chemical Society, vol. 69, pp. 1199–1203.

CARL D. QUARFORTH, Primary Examiner

R. L. TATE, Assistant Examiner

U.S. Cl. X.R.

423—644